United States Patent Office 3,595,689
Patented July 27, 1971

3,595,689
SUBSTRATE TREATED WITH A FLUORINE-CONTAINING AROMATIC COMPOUND
Everett E. Gilbert, Morristown, N.J., Jack L. Herz, Syracuse, N.Y., and John J. Murray, Stirling, Alson K. Price, Morristown Township, and Richard F. Sweeney, Randolph Township, Morris County, N.J., assignors to Allied Chemical Corporation, New York, N.Y.
No Drawing. Filed Apr. 1, 1968, Ser. No. 717,981
Int. Cl. D06m 15/00
U.S. Cl. 117—121                                18 Claims

ABSTRACT OF THE DISCLOSURE

This specification discloses novel aromatic compositions containing two fluoroalkyl substituents each containing at least four perfluorinated carbon atoms. These compositions are prepared by reacting a phenylene diamine, aminophenol or dihydroxybenzene, substituted or unsubstituted, with a polyfluoroalkyl carboxylic acid or a polyfluoroalkoxyalkyl carboxylic acid, or the corresponding acid halide, ester or anhydride of these acids. The novel compositions of the invention are useful as oil repellent coatings and sizes, particularly for textiles.

---

We have discovered novel fluorine-containing aromatic compositions having the formula

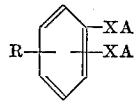

wherein X at each occurrence is a divalent radical independently selected from the group consisting of

A at each occurrence is a fluorinated aliphatic radical having at least three terminal perfluorinated carbon atoms and a total of at least four perfluorinated carbon atoms; and R is a substituent which can be hydrogen; an alkyl radical of 1 to 5 carbon atoms; a halogen; nitro; a radical of the formula

wherein $R_1$ is hydrogen or an alkyl radical of 1 to 18 carbon atoms; a radical of the formula

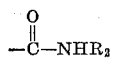

wherein $R_2$ is a member selected from the group consisting of hydrogen, alkyl radicals of 1 to 18 carbon atoms, —$(CH_2)_rX'$ wherein $X'$ represents a halogen, a pyridinium salt of said halogen, hydroxyl and —$OSO_3H$ or an alkali metal derivative thereof and $r$ is an integer of at least 2; a radical of the formula

—$NHR_3$ wherein $R_3$ is a member selected from the group consisting of hydrogen, alkyl radicals of 1 to 5 carbon atoms,

radicals wherein $R_4$ represents an alkyl radical of 1 to 18 carbon atoms, —$CH=CH_2$, —$(CH_2)_sX''$ radicals wherein $X''$ represents a halogen or a pyridinium salt of said halogen and $s$ is an integer of at least 1, a sulfonyl radical comprising the free acid or an ester or alkali metal derivative thereof, —$SO_2R_5$ wherein $R_5$ is a halogen, and —$SO_2NHR_2$ wherein $R_2$ is as defined above.

In a preferred embodiment of the invention, A at each occurrence is selected from the group consisting of
(a) Perfluoroalkyl radicals of the formula —$C_nF_{2n+1}$ wherein $n$ is an integer from 4 to 20;
(b) Polyfluoroalkyl radicals of the formula

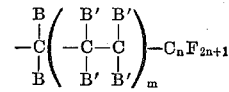

wherein B at each occurrence is hydrogen or fluorine and B' at each occurrence independently is hydrogen, fluorine or a perfluoroalkyl radical of 1 to 8 carbon atoms, $m$ is an integer from 1 to 20 and $n$ is as defined above; and
(c) Polyfluoroalkoxyalkyl radicals of the formula

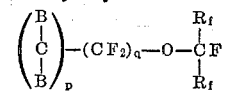

wherein B is as defined above, $p$ is an integer from 0 to 40, $q$ is an integer from 1 to 20 and $R_f$ is a perfluoroalkyl radical of 1 to 8 carbon atoms. The compositions of the invention are useful as oil and stain repellents, as foaming agents or as precursors for foaming agents and as additives to lower the surface energy of polymers.

The N,N'-phenylenediamides of the present invention can be prepared by reacting a phenylenediamine, including o-phenylenediamine, m-phenylenediamine, p-phenylenediamine and phenylenediamines having appropriate substituents on the benzene ring as hereinabove described, with a polyfluoroalkyl or polyfluoroalkoxyalkyl carboxylic acid reactant. They can be reduced to the corresponding diamines. The amidoesters and diesters of the invention can be prepared by reaction of the polyfluoroalkyl or polyfluoroalkoxyalkyl carboxylic acid reactants with an aromatic diol or aminophenol. The term carboxylic acid reactant includes the free carboxylic acids, as well as their ester, anhydride or acyl halide derivatives.

According to the preferred embodiment of the invention perfluoroalkyl carboxylic acids suitable for use in the invention have the formula HOOC—$C_nF_{2n+1}$ wherein $n$ has the meaning given above and include saturated straight chain and branched chain carboxylic acids, such as perfluorobutyric acid, perfluorovaleric acid, perfluorocaproic acid, perfluorooctanoic acid, perfluorolauric acid, perfluoropalmitic acid, perfluorostearic acid and perfluorooctadecyl acid as well as the various isomeric forms of these acids. Illustrative of the carboxylic acid derivatives which can be substituted for the above-described free acids include the corresponding lower alkyl esters such as the methyl, ethyl, propyl and butyl esters; acid halides such as the acid chloride, acid bromide and acid fluoride; and the acid anhydrides as well.

Perfluorocarboxylic acids containing up to about 10 carbon atoms are readily prepared by the electrochemical fluorination of carboxylic acids in anhydrous hydrogen fluoride with subsequent hydrolysis of the resulting perfluorocarboxylic acid fluoride, as disclosed in U.S. Pat. 2,567,011, issued Sept. 4, 1951. Longer chain perfluorocarboxylic acid reactants, i.e. those containing over about 10 carbon atoms, may be obtained by reaction of primary perfluoroalkyl iodides with oleum containing from about 5% to about 70% of sulfur trioxide at temperatures from 100° C. to 175° C., followed by hydrolysis of the resulting perfluorocarboxylic acid fluoride as disclosed in French Pat. 1,343,601 of Oct. 14, 1963.

Polyfluoroalkyl carboxylic acids having the formula

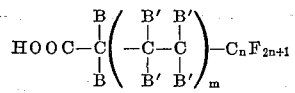

wherein B, B', m and n have the meaning given above, include $$HOOC-CH_2(CF_2)_4CF_3$$
$$HOOC-CH_2(CF_2)_6CF_3$$
$$HOOC-CH_2(CF_2CH_2)_2C_3F_7$$
$$HOOC-CH_2(CF_2CH_2)_4C_3F_7$$

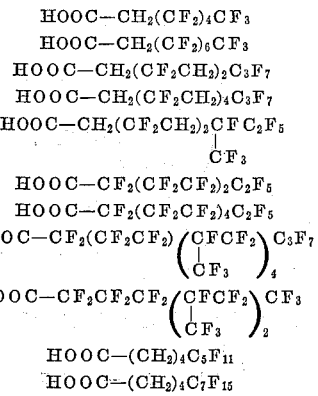

$$HOOC-(CH_2)_4C_5F_{11}$$
$$HOOC-(CH_2)_4C_7F_{15}$$

and the like.

Polyfluoroalkyl carboxylic acids such as those described above are known in the art. For example, acids having the general formula:

$$R_f(CH_2CF_2)_nCH_2COOH$$

wherein $R_f$ is a perfluoroalkyl radical have been disclosed by M. Hauptschein and M. Braid, J. Am. Chem. Soc., 83 2500 (1961). They are prepared by reacting primary perfluoroalkyl iodides with chlorosulfonic acids and hydrolyzing the resultant chlorosulfates. Carboxylic acids having the general formula $$R_fCH_2CH_2(CH_2)_nCOOH$$

wherein $R_f$ is a perfluoroalkyl group have been disclosed by N. O. Brace, J. Org. Chem., 27 4491 (1962). They are prepared by addition of an iodoperfluoroalkane with a terminally unsaturated carboxylic acid under free radical conditions to form the iodo adduct which can be reduced to the corresponding polyfluoroalkyl carboxylic acid.

The polyfluoroalkoxy carboxylic acids suitable for use in the invention include those having the formula

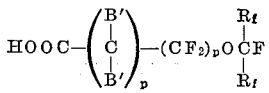

wherein B', $R_f$, p and q have the meanings given above and include the following $$HOOC-(CF_2)_3OCF(CF_3)_2$$
$$HOOC-(CF_2)_5OCF(CF_3)_2$$
$$HOOC-(CF_2)_7OCF(CF_3)_2$$
$$HOOC-(CF_2)_{11}OCF(CF_3)_2$$
$$HOOC-(CF_2)_{12}OCF(CF_3)_2$$
$$HOOC-(CF_2)_{17}OCF(CF_3)_2$$
$$HOOC-(CF_2)_5OCF(CF_2CF_3)_2$$
$$HOOC-CH_2(CF_2)_3OCF(CF_3)_2$$
$$HOOC-(CH_2)_3(CF_2)_5OCF(CF_3)_2$$
$$HOOC-(CH_2)_2CFCF_3(CF_2)_2OCF(CF_3)_2$$

and the like.

These acids can be prepared for example by the reaction of a perfluorinated ketone with an ionizable fluoride salt to form a fluorinated organic salt and then reacting the organic salt with a halogen other than fluorine and an olefin to form a perfluoroalkoxyalkyl halide. This process is more fully described in a copending application of Litt et al., Ser. No. 492,276 filed Oct. 1, 1965, now Pat. No. 3,453,333. These perfluoroalkoxyalkyl halides can be telomerized by reaction with an ethylenically unsaturated compound, such as tetrafluoroethylene, ethylene and the like, under free radical conditions in a manner analogous to that described above for primary perfluoralkyl iodides.

This process is disclosed in greater detail in a copending application of Anello et al., Ser. No. 633,359 filed Apr. 25, 1967, now Pat. No. 3,514,487.

As is further disclosed in the application of Litt et al. supra, the carboxylic acids corresponding to these perfluoroalkoxyalkyl halides can be prepared by reacting a suitable perfluoroalkoxyalkyl halide with a Grignard reagent to form a magnesium halide adduct, reacting this adduct with carbon dioxide to form a magnesium halide salt and hydrolyzing this salt to the corresponding perfluoroalkoxyalkyl carboxylic acid. The reaction can be illustrated further by the equation given below:

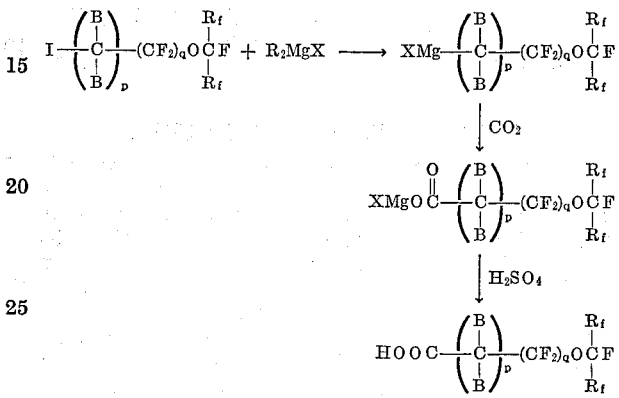

wherein $R_2MgX$ represents a Grignard reagent, and B, $R_f$, p and q are as defined hereinabove.

The telomer iodides disclosed by Anello et al., supra, having the general formula $$(CF_3)_2CFO(CF_2CF_2)_m(CH_2CH_2)_nI$$

wherein the carbon atom adjacent to the iodine atom contains two hydrogen atoms, can be converted to the corresponding acid by reaction with $SO_3$ to form the sulfate, hydrolyzing the sulfate with sulfuric acid to form the alcohol and oxidizing the alcohol to the corresponding acid. Telomer iodides having the general formula $$(CF_3)_2CFO(CF_2CF_2)_mI$$

wherein the carbon atom adjacent to the iodine atom contains fluorine atoms can be converted to the corresponding acid by reaction with $SO_3$ to form the acid halide and hydrolyzing the acid halide to the free acid.

Other polyfluoroalkoxyalkyl carboxylic acids suitable for use in the invention include those having the formula $$R_f'CF-O-[CF(CF_3)-CF_2-O]_n-CF(CF_3)-C\overset{O}{\underset{Y}{\diagdown}}$$

wherein $R_f'$ is a perfluoroalkyl radical of three to eight carbon atoms, n is an integer from zero to twenty inclusive, and COY is the carboxylic acid group or a carboxylic acid derivative group. These compositions are disclosed in U.S. Pat. 3,274,239 issued Sept. 20, 1966, to Selman.

Polyfluoroalkoxyalkyl carboxylic acids having the formula $$R_f''CH_2-CH_2(CH_2)_mO(CH_2)_2COOH$$

wherein $R_f''$ is a perfluoroalkyl group of up to 20 carbon atoms and m is an integer of 0 to 14, have been disclosed in U.S. Pat. 3,145,222 issued Aug. 18, 1964 to Brace.

Other suitable fluorinated carboxylic acids useful in the present invention will be known to one skilled in the art.

The compositions of the invention can be prepared by admixing the above-described fluorine-containing carboxylic acids or their corresponding acid halides, esters or anhydrides, with the desired substituted or unsubstituted phenylenediamine, aminophenol or aromatic diol. Generally, about two mols of fluorine-containing carboxylic acid reactant will be present for each mol of the aromatic compound, which corresponds to the amount required theoretically for complete reaction. However, an excess of either reactant can also be present.

The reaction can be carried out in the presence of an inert solvent which is a solvent for at least one of the reactants. Suitable solvents include nitroalkanes such as nitromethane and nitroethane; aromatic hydrocarbons such as benzene, toluene and xylene; acetonitrile; tertiary amides such as dimethylformamide and dimethylacetamide; halogenated aliphatic and aromatic hydrocarbons such as methylene chloride, chloroform, carbon tetrachloride, chlorobenzene and o-dichlorobenzene; dialkyl ethers such as diethyl ether, diisobutyl ether and di-n-hexyl ether; glycol ethers such as diethylene glycol and diethyl carbitol; and heterocyclic compounds such as pyridine and 1-methyl-2-pyrrolidinone.

The temperature of the reaction is not critical and generally temperatures from about 0° C. to about 150° C. are suitable. In the case where a solvent is employed, temperatures from room temperature to the reflux temperature of the reaction mixture are preferred.

In the case where the carbon atom adjacent to the carbonyl group of the carboxylic acid reactant bears two hydrogen substituents, prolonged reaction at elevated temperatures may result in formation of a 2-substituted benzimidazole composition rather than the desired dipolyfluoroalkyl or dipolyfluoroalkoxyalkyl compound. Thus, the reaction should be stopped after formation of the desired compound. The optimum time and temperature for each set of reactions can be determined by test runs for each system as will be known to one skilled in the art.

When the free polyfluoroalkyl or polyfluoroalkoxyalkyl carboxylic acid is employed, water is formed as the by-product of the reaction and it can be removed by conducting the reaction at a temperature above the boiling point of water. Alternatively, the reaction can be conducted at lower temperatures in presence of organic liquids which form azeotropic mixtures with water readily, such as xylene, toluene, benzene, Tetralin and the like, thereby removing water from the reaction mixture as it is formed.

When the polyfluoroalkyl or polyfluoroalkoxyalkyl carboxylic acid reactant employed is an ester derivative, an alcohol is obtained as a by-product of the reaction. The alcohol can be removed readily by conducting the reaction at about the reflux temperature of the alcohol, distilling it off as it forms.

When the polyfluoroalkyl or polyfluoroalkoxyalkyl carboxylic acid reactant employed is an acid halide derivative, a halogen acid is formed as a by-product of the reaction and it is desirable to have a halogen-acid acceptor present in the reaction mixture. Suitable acceptors include trialkylamines such as trimethylamine and triethylamine; alkali metal hydroxides or carbonates such as sodium hydroxide or potassium carbonate; pyridine and the like which react with the halogen acid formed during the reaction to form a by-product salt. The insoluble by-product salt can be separated from the product by dissolving it in water or dilute base and decanting off the aqueous layer.

The crude product can be further purified by conventional techniques such as by fractional distillation, recrystallization from an appropriate solvent such as methanol, ethanol, acetonitrile, dimethylformamide, chloroform, carbon tetrachloride, toluene, etc., as will be known to one skilled in the art.

The compositions as prepared above can also be reacted to add substituents such as amines, nitro, sulfonyl chloride, and the like to the phenylene ring, in known manner.

Nitration of the phenylene ring can be carried out in conventional manner in the presence of a mixture of nitric and sulfuric acids or of nitric and acetic acids. Nitration can also be effected with various stable nitronium salts, such as with nitryl tetrafluoroborate or with a mixture of nitryl chloride and anhydrous silver tetrafluoroborate.

The preparation of an amino-substituted phenylene compound can be effected conveniently by reduction of a nitrated compound. The nitro-substituted compounds can be reduced with hydrogen using platinum oxide as a catalyst, or with tin and hydrochloric acid, neutralizing the excess acid and dissolving the tin by adding an alkali. Other metals can also be employed, such as iron in hydrochloric acid, or zinc in an alkali.

Aryl sulfonic acids can be prepared by sulfonation with sulfuric acid, complexes of sulfur trioxide with pyridine and dioxane, and sulfuric acid in the presence of thionyl chloride. The aryl sulfonic acids can be converted into sulfonyl chlorides by interaction with phosphorus halides. Aryl sulfonyl chlorides can be prepared by reaction of the aryl compound with an excess of chlorosulfonic acid. The aryl sulfonyl chlorides can be reacted in conventional manner with an alcohol or a sodium alkoxide to form the corresponding ester derivatives, and with ammonia or amines to form sulfonamides. Aryl sulfonamides can in turn be reacted with hypochlorites to form the corresponding N-chlorosulfonamides.

The compositions of the invention are useful as precursors for foaming agents and as additives for polymers which will reduce their surface energy. The compositions are particularly valuable as oil repellency agents for various articles, particularly for yarns and textiles as will appear hereinafter.

The following examples are given to further illustrate the preparation of typical compounds of the invention but it is understood that they are not meant to limit the scope thereof to any of the details set forth therein. In the examples, all parts and percentages are by weight unless otherwise noted.

EXAMPLE 1

105 parts of perfluorooctanoyl chloride were added slowly to a solution containing 13 parts of o-phenylenediamine in 490 parts of pyridine. When the addition was complete, the mixture was heated to 50° C. for one hour, cooled and combined with 1000 parts of water. The product precipitated was collected by filtration and was recrystallized from carbon tetrachloride.

76 parts (70% of theoretical) of 1,2-bis(perfluorooctanamido)benzene were obtained as a colorless, crystallins solid having a melting point of 120–122° C. The structure was confirmed by infrared analysis.

*Elemental analysis.*—Calculated for $C_{22}H_6F_{30}N_2O_2$ (percent): C, 29.3; H, 0.67; F, 63.3; N, 3.11. Found (percent): C 29.9; H, 0.96; F, 64.3; N, 3.3

EXAMPLE 2

174 parts of perfluorooctanoyl chloride were admixed with 43 parts of o-phenylenediamine. The mixture grew hot and solidified. 100 ml. of dimethylformamide were added and the mixture refluxed (about 135° C.) for one hour. The mixture was poured into 2500 parts of water and let stand overnight. The precipitated product was collected by filtration. The product was dissolved in ethanol, charcoal was added and the product precipitated with water. The precipitate was recrystallized from ethylene chloride and confirmed as 1,2-bis(perfluorooctanamido)-benzene by elemental analysis.

EXAMPLE 3

97.5 parts of perfluorooctanoic acid and 30 parts of o-phenylenediamine were refluxed in about 800 parts of dilute hydrochloric acid containing about 25% by volume of ethylene glycol and about 35% by volume of monoethyl cellosolve for 26 hours. The mixture was poured over cracked ice and the resultant precipitate washed with ammonia, and then with water. The product was confirmed as 1,2-bis(perfluorooctanamido)benzene by infrared analysis.

EXAMPLE 4

18 parts of p-phenylenediamine were dissolved in 983 parts of pyridine. 150 parts of perfluorooctanoyl chloride were added dropwise while stirring. The product precipitated and was washed with benzene.

140 parts of 1,4-bis(perfluorooctanamido)benzene were obtained as a solid. After recrystallizing from dimethylformamide, its melting point was 229°–231° C. It was slightly soluble in hot acetone. The structure was confirmed by infrared analysis.

EXAMPLE 5

54 parts of m-phenylenediamine were dissolved in 2949 parts of pyridine and 450 parts of perfluorooctanoyl chloride were added dropwise. The product was filtered, washed with benzene and recrystallized from acetone.

1,3-bis(perfluorooctanamido)benzene was obtained as a beige-colored solid having a melting point of 190–192° C.

Other compounds illustrative of the present invention as set forth in Table I are prepared in a manner analogous to those described in Examples 1 to 5 above by reacting an ortho-, meta- or para-phenylenediamine with other polyfluoroalkyl carboxylic acid reactants.

TABLE I

| Example | Polyfluorocarboxylic acid reactant | Phenylenediamine | Product |
|---|---|---|---|
| 6 | $CH_3OOC(CF_2)_4CF_3$ | o-Phenylenediamine | benzene ring with $-NHCO(CF_2)_4CF_3$ and $-NHCO(CF_2)_4CF_3$ |
| 7 | $BrOC(CF_2)_3CF(CF_3)_2$ | do | benzene ring with $-NHCO(CF_2)_3CF(CF_3)_2$ and $-NHCO(CF_2)_3CF(CF_3)_2$ |
| 8 | $ClOC(CF_2)_2CF\text{-}CF_2CF(CF_3)_2$ with $CF_3$ branch | do | benzene ring with $-NHCO(CF_2)_2CFCF_2CF(CF_3)_2$ (with $CF_3$) twice |
| 9 | $C_2H_5OOC(CF_2)_{12}CF_3$ | do | benzene ring with $-NHCO(CF_2)_{12}CF_3$ twice |
| 10 | $ClOC(CF_2)_{14}CF_3$ | do | benzene ring with $-NHCO(CF_2)_{14}CF_3$ twice |
| 11 | $C_4H_9OOC(CF_2)_7CF_3$ | do | benzene ring with $-NHCO(CF_2)_7CF_3$ twice |
| 12 | $C_4H_9OOC(CF_2)_7CF_3$ | m-Phenylenediamine | benzene ring with $-NHCO(CF_2)_7CF_3$ (meta) |
| 13 | $C_4H_9OOC(CF_2)_7CF_3$ | p-Phenylenediamine | benzene ring with $NHCO(CF_2)_7CF_3$ (para) |
| 14 | $ClOCCF_2(CF\text{-}CF_2)_3CF_3$ with $CF_3$ | o-Phenylenediamine | benzene ring with $-NHCOCF_2(CF\text{-}CF_2)_3CF_3$ (with $CF_3$) twice |
| 15 | $ClOC(CF_2)_{11}CF(CF_3)_2$ | do | benzene ring with $-NHCO(CF_2)_{11}CF(CF_3)_2$ twice |
| 16 | $HOOC(CF_2)_6CF_3$ | do | benzene ring with $-NHCO(CF_2)_6CF_3$ twice |

TABLE I.—Continued

| Example | Polyfluorocarboxylic acid reactant | Phenylenediamine | Product |
|---|---|---|---|
| 17 | $ClOC(CF_2)_{18}CF_3$ | ...do... | benzene with $-NHCO(CF_2)_{18}CF_3$ and $-NHCO(CF_2)_{18}CF_3$ |
| 18 | $HOOC\ CH_2(CF_2)_6CF_3$ | ...do... | benzene with $-NHCOCH_2(CF_2)_6CF_3$ and $-NHCOCH_2(CF_2)_6CF_3$ |
| 19 | $HOOC\ CH_2CH_2(CF_2)_6CF_3$ | ...do... | benzene with $-NHCOCH_2CH_2(CF_2)_6CF_3$ and $-NHCOCH_2CH_2(CF_2)_6CF_3$ |
| 20 | $HOOC(CH_2)_3(CF_2)_6CF_3$ | ...do... | benzene with $-NHCO(CH_2)_3(CF_2)_6CF_3$ and $-NHCO(CH_2)_3(CF_2)_6CF_3$ |
| 21 | $HOOC(CH_2)_3(CF_2)_8CF_3$ | ...do... | benzene with $-NHCO(CH_2)_3(CF_2)_8CF_3$ and $-NHC-(CH_2)_3(CF_2)_8CF_3$ |
| 22 | $HOOC(CH_2)_3(CF_2)_{10}CF_3$ | ...do... | benzene with $-NHCO(CH_2)_3(CF_2)_{10}CF_3$ and $-NHCO(CH_2)_3(CF_2)_{10}CF_3$ |
| 23 | $HOOC(CH_2)_3(CF_2)_8CF(CF_3)_2$ | ...do... | benzene with $-NHCO(CH_2)_3(CF_2)_8CF(CF_3)_2$ and $-NHCO(CH_2)_3(CF_2)_8CF(CF_3)_2$ |
| 24 | $HOOC(CH_2)_3(CF_2)_3CF(CF_2CF_3)_2$ | ...do... | benzene with $-NHCO(CH_2)_3(CF_2)_3CF(CF_2CF_3)_2$ and $-NHCO(CH_2)_3(CF_2)_3CF(CF_2CF_3)_2$ |
| 25 | $HOOC(CH_2)_2\overset{CF_3}{\underset{|}{C}}F(CF_2)_4CF_3$ | ...do... | benzene with $-NHCO(CH_2)_2\overset{CF_3}{\underset{|}{C}}F(CF_2)_4CF_3$ and $-NHCO(CH_2)_2\overset{CF_3}{\underset{|}{C}}F(CF_2)_4CF_3$ |

EXAMPLE 26

15.9 parts of finely divided 3,4-diaminotoluene were dissolved in 200 parts by volume of pyridine at 20° C. While stirring the solution, 117 parts of perfluorooctanoyl chloride were added dropwise over a period of 45 minutes. When the addition was complete, the mixture was heated at 50° C. for two hours while stirring. The mixture was cooled to room temperature, diluted with 1500 parts of water, stirred overnight and filtered.

118.3 parts of crude product were obtained. The product was recrystallized from absolute methanol.

90 parts of 3,4-bis(perfluorooctanamido)toluene were obtained having a melting point of 113–119° C. The structure was confirmed by infrared analysis.

EXAMPLE 27

1.43 parts of 4-chloro-o-phenylenediamine which had been recrystallized from a solution of 3:1 parts by volume of petroleum ether:benzene were dissolved in 20 parts by volume of pyridine at 10° C. 9.09 parts of perfluorooctanoyl chloride were added dropwise over a ten minute period and stirring continued at room temperature for an additional 30 minutes. The mixture was poured into 400 parts of ice water, stirred for four hours and the liquid decanted. The orange solids were triturated with petroleum ether, heated on a steam bath for 5 minutes, cooled to room temperature and filtered.

The product was recrystallized twice form acetonitrile and had a melting point of 114–117° C.

Elementaly analysis for 3,4 - bis(perfluorooctanamido)-chlorobenzene was as follows. — Calculated for $C_{22}H_5F_{30}N_2O_2Cl$ (percent): C, 28.2; H, 0.5; N, 3.0. Found (percent): C, 27.7; H, 1.3; N, 3.3.

EXAMPLE 28

18 parts of finely divided 3,4-bis(perfluorooctanamido) benzene were stirred with 26 parts of concentrated nitric acid and 80 parts of concentrated sulfuric acid for 18 hours. The mixture was poured into 500 parts of ice water, filtered and washed with water.

The product was recrystallized twice from acetonitrile. It had a melting point of 170–173° C.

The structure of 3,4 - bis(perfluorooctanamido)nitrobenzene was confirmed by infrared analysis.

Elemental analysis was as follows.—Calculated for $C_{22}H_5F_{30}N_3O_4$ (percent): C, 28.0; H, 0.53; N, 4.44. Found (percent): C, 28.0; H, 1.05; N, 4.65.

EXAMPLE 29

8.3 parts of 3,4-diaminomethyl benzoate were dissolved in 75 parts by volume of pyridine at 10° C. and stirred while 45 parts of n-perfluorooctanoyl chloride were added. The mixture was stirred at room temperature for one hour, heated to 50° C., cooled to room temperature and poured into 750 parts of ice water. The mixture was stirred for two hours and filtered.

46 parts of product were recrystallized twice from absolute methanol. It had a melting point of 138–141° C.

The structure for 3,4-bis(perfluorooctanamido)methylbenzoate was confirmed by infrared analysis.

*Elemental analysis.* — Calculated for $C_{24}H_8F_{30}N_2O_4$ (percent): C, 30.0; N, 2.92. Found (percent): C, 30.0; N, 2.92.

EXAMPLE 30

5.0 parts of 3,4-bis(perfluorooctanamido)nitrobenzene, prepared as in Example 8, 5.0 parts of granulated tin, 25 parts by volume of 75% hydrochloric acid and 100 parts by volume of 95% ethanol were mixed and stirred at reflux for 90 minutes. An additional 50 parts by volume of ethanol were added to effect complete solution. The pale yellow solution was decanted, reduced to about one-half volume under vacuum when a precipitate formed. 6 N sodium hydroxide was added until the solution was basic, 500 parts of water were added and the mixture was filtered.

The filtrate was extracted with 150 parts by volume of ether, the solution dried over anhydrous magnesium sulfate and evaporated to dryness on a steam bath.

2.1 parts of crude product were obtained. The product was recrystallized from absolute ethanol. It had a melting point of 168–174° C.

The product was confirmed as 3,4 - bis(perfluorooctanamido)aniline by elemental analysis.

EXAMPLE 31

5.5 parts of 3,4 - bis(perfluorooctanamido)aniline prepared as in Example 30, 0.48 part of pyridine and 30 parts by volume of 1-methyl-2-pyrrolidinone were stirred at 10° C. and 0.75 part of chloroacetyl chloride dissolved in 5 parts by volume of 1-methyl-2-pyrrolidinone was added slowly. The solution was stirred at room temperature for 30 minutes, heated at 50° C. for 15 minutes, cooled to room temperature and poured into 300 parts of ice water. The resultant mixture was stirred for one hour and filtered.

5.85 parts of product were obtained and were recrystallized once from absolute ethanol and once from acetonitrile. The purified product had a melting point of 167–172° C.

The structure for 3,4-bis(perfluorooctanamido)chloroacetanilide was confirmed by infrared analysis.

*Elemental analysis.* — Calculated for $C_{24}H_8F_{30}N_3O_3Cl$ (percent): C, 29.0; H, 0.81. Found (percent): C, 29.0; H, 1.60.

EXAMPLE 32

2.0 parts of 3,4-bis(perfluorooctanamido)nitrobenzene prepared as in Example 28 was dissolved in 100 parts by volume of absolute ethanol. The solution was charged to a pressure bottle and 0.05 part of platinium oxide added. Hydrogen was fed to the bottle an initial pressure of 29 p.s.i. for twenty minutes. The reaction mixture was filtered and the filtrate evaporated on a steam bath.

1.80 parts of product were obtained. The product was recrystallized from absolute ethanol.

1.30 parts of 3,4-bis(perfluorooctanamido)aniline were obtained having a melting point of 167–174° C.

*Elemental analysis.* — Calculated for $C_{22}H_7F_{30}NO_2$ (percent): C, 28.9; H, 0.76; N, 4.59. Found (percent): C, 29.3; H, 1.0; N, 4.72.

EXAMPLE 33

9.0 parts of 1,2 - bis(perfluorooctanamido)benzene as prepared in Example 1 were added in increments to 44.75 parts of chlorosulfonic acid over a 30 minute period while stirring continuously. The mixture was heated at 60–65° C. until the evolution of gas had ceased. The mixture was cooled, added to ice water and filtered. The product was recrystallized three times from benzene.

3,4-bis(perfluorooctanamido)benzene sulfonyl chloride was obtained. Infrared analysis showed strong bands at 5.8, 6.6, and 7.3μ; an envelope of bands between 8 and 8.8μ; and a medium band at 2.8μ.

Elemental analysis was as follows:—Calculated for $C_{22}H_5F_{30}N_2O_4SCl$ (percent): C, 26.4; H, 0.5; F, 57; N, 2.8; S, 3.2; Cl, 3.5 Found (percent): C, 25.9; H, 0.9; F, 57.8; N, 2.9 S, 3.5 Cl, 4.0.

EXAMPLE 34

9.5 parts of 3,4-bis(perfluorooctanamido)benzene sulfonyl chloride as prepared in Example 33 were suspended in ice water and neutralized with sodium bicarbonate. The precipitate was filtered, and dissolved in diethyl ether. The solution was added dropwise to a mixture of 0.57 part of 2-aminoethanol in 5 parts by volume of diethyl ether. The mixture was stirred for five hours and filtered. The solvent was evaporated to give 1.4 parts of product. The product was recrystallized four times from acetonitrile and had a melting point of 173–174° C.

The structure for N-(2-hydroxyethyl)-3,4-bis(perfluorooctanamido)benzene sulfonamide was confirmed by infrared analysis which showed strong bands at 3,0, 5.9, 6.55, 7.05 and 7.5μ; an envelope of bands between 8 and 8.9μ; and medium bands at 9, 9.4, 9.75, 16.4 and 13.6μ.

*Elemental analysis.*—Calculated for $C_{24}H_{11}F_{30}N_3O_5S$ (percent): C, 28.15; H, 1.07; N, 4.1; F, 55.7; S, 3.1. Found (percent): C, 27.4; H, 1.3; N, 4.2; F, 56.0; S, 3.2.

EXAMPLE 35

1.1 parts of o-phenylene diamine were dissolved in 50 parts by volume of pyridine at 5° C. and 8 parts of 2,2,3,3,4,4 - hexafluoro-4-heptafluoroisopropoxybutanoyl chloride were added slowly, maintaining the temperature below 15° C. The mixture was heated at 50° C. for ½ hour and cooled to room temperature. The mixture was poured into 600 parts of ice water and stired overnight. The liquid was decanted and the oily residue washed with water to give 4.8 parts of a tan-colored product.

The product was recrystallized from toluene. 3.6 parts of product were obtained having a melting point of 86–88° C.

The structure for 1,2-bis(2,2,3,3,4,4-hexafluoro-4-heptafluoroisopropoxybutyramido)benzene was confirmed by infrared analysis.

*Elemental analysis.*—Calculated for $C_{20}H_6F_{26}N_2O_4$ (percent): N, 3.36. Found (percent): N, 3.56.

EXAMPLE 36

0.86 part of m-phenylenediamine was dissolved in 30 parts by volume of pyridine at 5° C. and 7 parts of 2,2,3,3,4,4-hexafluoro-4-heptafluoroisopropoxybutanoyl chloride were added dropwise over a 10 minute period. The reaction mixture was heated at 50° C. for 30 minutes and cooled to room temperature. The blood-red reaction mixture was poured into 300 parts of ice water and filtered.

The crude product was recrystallized from toluene. 4.6 parts of product having a melting point of 106–110° C. were obtained.

The structure for 1,3-bis(2,2,3,3,4,4-hexafluoro-4-heptafluoroisopropoxybutyramido)benzene was confirmed by infrared analysis.

*Elemental analysis.*—Calculated for $C_{20}H_6F_{26}N_2O_4$ (percent): N, 3.36. Found (percent): N, 3.6.

EXAMPLE 37

1.0 part of o-phenylenediamine was dissolved in 50 parts by volume of pyridine at 5° C. 10 parts of 2,2,3,3,4,4,5,5,6,6 - decafluoro - 6-heptafluoroisopropoxyhexanoyl chloride were added dropwise over a 10 minute period. The mixture was stirred for 45 minutes, and poured into 600 parts of ice water. The mixture was stirred for one hour and filtered.

The crude product was recrystallized from acetonitrile and had a melting point of 103–105° C.

Infrared analysis confirmed the structure for 1,2-bis(2,2,3,3,4,4,5,5,6,6 - decafluoro - 6-heptafluoroisopropoxyhexanamido)benzene.

*Elemental analysis.*—Calculated for $C_{24}H_6F_{34}N_2O_4$ (percent): N, 2.71. Found (percent): N, 2.81.

Other compounds illustrative of the invention as set forth in Table II are prepared in a manner analogous to those described in Examples 35–37 above by reacting an ortho-, meta- or para-phenylenediamine with other polyfluoroalkoxyalkyl carboxylic acid reactants.

4.8 parts of perfluorooctanoyl chloride were added dropwise. The reaction mixture was refluxed one hour longer, filtered hot and cooled to room temperature.

4.6 parts of product were obtained and confirmed as 2-(perfluorooctanamido)phenylperfluorooctanoate by infrared analysis.

EXAMPLE 49

0.55 part of catechol, 0.6 part of anhydrous potassium fluoride and 40 parts by volume of anhydrous ace-

TABLE II

| Example | Polyfluorocarboxylic acid reactant | Phenylenediamine | Product |
|---------|-----------------------------------|------------------|---------|
| 38 | $HOOC(CF_2)_7OCF(CF_3)_2$ | o-Phenylenediamine | benzene with two $-NHCO(CF_2)_7OCF(CF_3)_2$ groups |
| 39 | $HOOC(CF_2)_9OCF(CF_3)_2$ | do | benzene with two $-NHCO(CF_2)_9OCF(CF_3)_2$ groups |
| 40 | $HOOC(CF_2)_{10}OCF(CF_3)_2$ | do | benzene with two $-NHCO(CF_2)_{10}OCF(CF_3)_2$ groups |
| 41 | $HOOC(CF_2)_{11}OCF(CF_3)_2$ | do | benzene with two $-NHCO(CF_2)_{11}OCF(CF_3)_2$ groups |
| 42 | $HOOC(CF_2)_{17}OCF(CF_3)_2$ | do | benzene with two $-NHCO(CF_2)_{17}OCF(CF_3)_2$ groups |
| 43 | $HOOC(CF_2)_9OCF(CF_2CF_3)_2$ | do | benzene with two $-NHCO(CF_2)_9OCF(CF_2CF_3)_2$ groups |
| 44 | $HOOCCH_2(CF_2)_4OCF(CF_3)_2$ | do | benzene with two $-NHCOCH_2(CF_2)_4OCF(CF_3)_2$ groups |
| 45 | $HOOC(CH_2)_3(CF_2)_4OCF(CF_3)_2$ | do | benzene with two $-NHCO(CH_2)_3(CF_2)_4OCF(CF_3)_2$ groups |
| 46 | $HOOC(CH_2)_3(CF_2)_6OCF(CF_3)_2$ | do | benzene with two $-NHCO(CH_2)_3(CF_2)_6OCF(CF_3)_2$ groups |
| 47 | $HOOC(CH_2)_5(CF_2)_6OCF(CF_3)_2$ | do | benzene with two $-NHCO(CH_2)_5(CF_2)_6OCF(CF_3)_2$ groups |

EXAMPLE 48

2.2 parts of o-aminophenol were dissolved in 30 parts by volume of pyridine at 10° C. 9 parts of perfluorooctanoyl chloride were added dropwise, the mixture was stirred at room temperature for 15 minutes longer and heated to 50° C. The mixture was cooled to room temperature and added to 300 parts of ice water. After stirring for one hour, the product was filtered.

9.5 parts of crude 2-perfluorooctanamidophenol-1 were obtained and were recrystallized from acetonitrile.

5.0 parts of the product, 75 parts by volume of anhydrous acetonitrile and 1.2 parts of anhydrous potassium fluoride were heated at reflux for 30 minutes when tonitrile were heated at reflux for 1.25 hours. 5 parts of perfluorooctanoyl chloride were added dropwise and refluxing continued for an additional 2 hours. The mixture was filtered hot and then cooled in ice for one hour.

1.4 parts of crude product were obtained. The product was recrystallized from petroleum ether and had a melting point of 48–49.5° C.

The structure for 1,2-bis(perfluorooctanoyloxy)benzene was confirmed by infrared analysis.

EXAMPLE 50

36 parts of 1,2 - bis(perfluorooctanamido)benzene as prepared in Example 1 was dissolved in 100 parts by volume of tetrahydrofuran. The solution was added dropwise to a solution of 4.7 parts of lithium aluminum hydride in 150 parts by volume of tetrahydrofuran at 5° C. over a 45 minute period. The mixture was then heated at reflux while stirring for 4.5 hours. The gray-green mixture was cooled and 5 parts of water was added. After one hour 4 parts by volume of a 20% solution of sodium hydroxide was added. The mixture was filtered, the precipitate washed with tetrahydrofuran and the filtrate evaporated to dryness.

The crude product was recrystallized twice from hexane. 19 parts of product having a melting point of 70–73° C. were obtained.

*Elemental analysis.*—Calculated for $C_{22}H_{10}F_{30}N_2$ (percent): C, 30.3; N, 3.21. Found (percent): C, 29.8; N, 3.44.

The structure for N,N'-[1,1-dihydroperfluorooctyl]-o-phenylenediamine was confirmed by infrared analysis.

It will be apparent to one skilled in the art that numerous additional compositions can be prepared in a manner analogous to that set forth in Examples 48–50 substituting other polyfluoroalkyl carboxylic acids and polyfluoroalkoxyalkyl carboxylic acids or their derivatives in place of perfluorooctanoyl chloride or by substituting other reactants in place of aminophenol or catechol bearing appropriate substituents on the benzene ring as described hereinabove.

The compositions of the invention are particularly useful as oil and stain repellents. They may be applied to an article to be rendered oil repellent by treating the same with a solution containing the repellent and evaporating the solvent. The following example demonstrates the use of compositions of the invention as oil repellent coatings.

EXAMPLE 51

8 parts each of 1,2-bis(perfluorooctanamido)benzene, 1,3-bis(perfluorooctanamido)benzene and 1,4-bis(fluorooctanamido)benzene, as prepared in Examples 1, 5 and 4 respectively, were dissolved in 1000 parts by volume of hot dimethylformamide. Clean glass microscope slides were dipped into the clear solutions for 10 minutes. A fourth slide was immersed into hot dimethylformamide as a control. The slides were removed, drained and air dried. Droplets of oil were placed on each slide and contact angle was measured with a goniometer. The results are given below:

| Resin: | Contact angle |
|---|---|
| 1,2-bis(perfluorooctanamido)benzene | 71.2 |
| 1,3-bis(perfluorooctanamido)benzene | 59.2 |
| 1,4-bis(perfluorooctanamido)benzene | 38.2 |
| Control | 27.7 |

Thus, the fluorinated compounds of the invention all imparted an oil-resistant coating to the slides.

EXAMPLE 52

The compositions of the invention were added to paper as oil repellent sizings according to the following procedure: preformed and weighed paper handsheets were saturated with an acetone solution of the test composition. The excess solution was blotted from the paper which was reweighed quickly to determine the amount of the size absorbed by the paper. The paper was then dried at 230° F. for one minute and tested for oil repellency. According to a standard test procedure, pure castor oil is successively diluted with increasing amounts of heptane and toluene in a series of twelve solutions. Solution No. 1 is pure castor oil and solution No. 12 is pure heptane. The solution having the highest number (lower viscosity) which will not penetrate the treated paper in 15 seconds is noted.

The results are given below:

| Test composition | Concentration added to paper, percent | Number |
|---|---|---|
| 3,4-bis(perfluorooctanamido)-benzene sulfonyl chloride | 0.7 | 9–10 |
| N-(2-hydroxyethyl)-3,4-perfluorooctanamido benzene sulfonamide | 0.72 | 12+ |

In addition to glass and paper, the surfaces of other substrates can be treated with solutions containing the compositions of the invention to render them oil repellent. Such materials include, for example, wood, plastics, leather, metals and the like.

The concentration of the oil repellent composition in solution can vary from about 0.5% to 10% by weight, preferably from about 1% to about 4%. The solvent used to formulate the oil repellent composition can be any organic liquid which is inert to the article to be treated and is capable of dissolving the required amount of the oil repellent agent. Suitable solvents include acetone, methyl ethyl ketone, acetonitrile and dimethylformamide. The solvent can be evaporated by air drying, perferably at room temperature. Alternatively, aqueous emulsions of the oil repellent agent can be applied to the article to be treated by conventional aqueous application methods.

The oil repellent compositions of the invention are especially useful in treating yarns and textiles (fibers or fabrics, woven or unwoven) comprised of natural and/or synthetic fibers including, for example, cotton, nylon, wool, silk, polyethylene terephthalate, linen and rayon, acrylics or their mixtures in any proportion. If desired additional agents such as those which will impart water repellency, crease resistance and softening properties, can be applied in conjunction with the oil repellent compositions of the invention.

The evaluation of typical compositions of the invention as oil repellent agents for textiles was made following the test procedure described on pages 323–324 of the April 1962 edition of the Textile Research Journal. Pieces of white cotton print cloth, conditioned at 50% R.H. were dipped for about 30 seconds into an acetone solution of the desired oil repellent composition as prepared in the examples given above. The treated cloths were blotted dry on paper towling, air dried overnight at 50% R.H. and weighed.

Mixtures of mineral oil ("Nujol") and n-heptane in proportions ranging from 0 to 100% each were prepared and drops of these mixtures were gently placed on the treated cloth and allowed to stand undisturbed for 3 minutes. The wetting and penetration of the cloth by the drops was observed visually and the oil repellency rating determined according to Table III set forth below corresponding to the highest proportion of n-heptane which does not penetrate or wet cloth, wherein an oil repellent composition having a rating of 80 or higher is considered a good to excellent oil repellent agent.

The treated cloths were then laundered and the oil repellency rating determined again. This cycle was repeated to determine the durability of the coating.

TABLE III

| Oil repellency rating | Percent | |
|---|---|---|
| | Mineral oil [1] | n-Heptane [2] |
| 150 | 0 | 100 |
| 140 | 10 | 90 |
| 130 | 20 | 80 |
| 120 | 30 | 70 |
| 110 | 40 | 60 |
| 100 | 50 | 50 |
| 90 | 60 | 40 |
| 80 | 70 | 30 |
| 70 | 80 | 20 |
| 60 | 90 | 10 |
| 50 | 100 | 0 |
| 0 | No holdout to mineral oil | |

[1] "Nujol" Saybolt viscosity 360/390 at 100° F. Specific gravity 0.880/0.900 to 60° F. Percent by volume at 20° C.
[2] Heptane B.P., 98–99° C. percent by volume at 20° C.

Following the procedure given above, various compositions were tested as oil repellents. The results are given in Table IV below.

TABLE IV

| Example | Composition | Concentration of solution, percent by weight | Oil repellency rating, after launderings of— | | | | | |
|---|---|---|---|---|---|---|---|---|
| | | | 0 | 1 | 2 | 3 | 4 | 5 |
| 53 | 1,2-bis(perfluorooctanamido)-benzene | 4 | 90–100 | 100 | 0 | | | |
| 54 | 3,4-bis(perfluorooctanamido)-toluene | 1 | 100 | 0 | | | | |
| 55 | 3,4-bis(perfluorooctanamido)-chlorobenzene | 1 | 90–110 | 0 | | | | |
| 56 | 3,4-bis(perfluorooctanamido)-methyl benzoate | 1 | 100 | 0 | | | | |
| 57 | 3,4-bis(perfluorooctanamido)-nitrobenzene | 1 | 100 | 0 | | | | |
| 58 | 3,4-bis(perfluorooctanamido)-benzene sulfonyl chloride | 1.5 | 130 | 90 | 50–60 | 0 | | |
| 59 | N-(2-hydroxyethyl)-3,4-bis(perfluorooctanamido)benzene sulfonamide | 1.75 | 150 | 120 | 110 | 80 | 80 | 60 |
| 60 | 1,2-bis(2,2,3,3,4,4-hexafluoro-4-heptafluroisopropoxy-butyramido)-benzene | | 100 | 90 | 80 | 0 | | |
| 61 | 1,3-bis(2,2,3,3,4,4-hexafluoro-4-heptafluoroisopropoxy-butyramido)-benzene | | 100 | 80 | 70 | 0 | | |
| 62 | 1,2-bis(2,2,3,3,4,4,5,5,6,6-decafluoro-6-heptafluoroisopropoxyhexanamido)benzene | | 130 | 120 | 110 | 0 | | |
| 63 | 2-(perfluorooctanamido)phenylperfluorooctanoate | | 90 | 60 | 0 | | | |
| 64 | 1,2-bis(perfluorooctanoyloxy)-benzene | | 80 | 0 | | | | |
| 65 | N,N'-[1-1,dihydroperfluorooctyl]-o-phenylenediamine | | 110 | 80 | 80 | 80 | 70 | |

EXAMPLE 66

3,4-bis(perfluorooctanamido)chloroacetanilide, as prepared in Example 31 above, was found to be outstanding as an oil repellency agent for various textiles. In addition to its initially excellent oil repellency rating, this compound was found to be very durable after repeated laundering cycles. The results of testing in accordance with the standard test procedure are given in Table V below. A 2% by weight solution in methylethyl ketone was employed for these tests.

TABLE V

| Cloth | Loading weight, percent | Oil repellency rating, after launderings of— | | | | | | | |
|---|---|---|---|---|---|---|---|---|---|
| | | 0 | 1 | 2 | 4 | 6 | 8 | 10 | 12 |
| Cotton | 2.0 | 140 | 120 | 90 | 100 | 80 | 0 | 60 | 0 |
| | 2.5 | 140 | 90 | 90 | 70 | 0 | 0 | | |
| | 3.2 | 140 | 120 | 100 | 90 | 0 | 50 | 0 | |
| Dacron-cotton | 1.8 | 140 | 100 | 80 | 90 | 80 | 60 | 60 | 0 |
| 65:35 poplin nylon taffeta | 1.2 | 140 | 110 | 110 | 100 | 110 | 100 | 100 | a 100 | a Oil repellency was 70 after 20 launderings.

EXAMPLE 67

The oil repellency ratings and durability of some of the compositions of the invention applied to fabric can be improved somewhat by pretreating the fabric with a base, such as a dilute aqueous alkali metal hydroxide or bicarbonate solution. Cotton cloth pretreated with a 5% solution of sodium hydroxide was dipped into a 2% solution of 3,4-bis(perfluorooctanamido)chloroacetanilide as prepared in Example 31 above in methylethyl ketone and tested for oil repellency in accordance with the procedure given above. The results are given in Table VI below:

TABLE VI

| Loading weight, percent | Oil repellency rating, after launderings of— | | | | | | | |
|---|---|---|---|---|---|---|---|---|
| | 0 | 1 | 2 | 4 | 6 | 8 | 10 | 20 |
| 1 | 130 | 120 | 110 | 100 | 100 | 90 | 80 | 70 |
| 1.5 | 130 | 130 | 120 | 110 | 100 | 90 | 100 | 90 |
| 1.5 | 130 | 130 | 120 | 110 | 100 | 100 | 100 | 90 |

It will be apparent that many variations and modifications may be effected without departing from the scope of the novel concepts of the present invention and the illustrative details disclosed herein are not to be construed as imposing undue limitations on the invention.

We claim:

1. Fluorine-containing compound of the formula

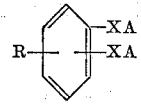

wherein X at each occurrence is a divalent radical independently selected from the group consisting of

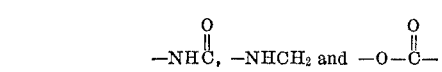

$-NH\overset{O}{\overset{\|}{C}}-$, $-NHCH_2-$ and $-O-\overset{O}{\overset{\|}{C}}-$ A at each occurrence is a fluorinated aliphatic radical having at least three terminal perfluorinated carbon atoms and a total of at least four perfluorinated carbon atoms; and R is a substituent which can be hydrogen; an alkyl radical of 1 to 5 carbon atoms; a halogen; nitro; a radical of the formula $$-\overset{O}{\overset{\|}{C}}-OR_1$$

wherein $R_1$ is hydrogen or an alkyl radical of 1 to 8 carbon atoms; a radical of the formula $$-\overset{O}{\overset{\|}{C}}-NHR_2$$

wherein $R_2$ is a member selected from the group consisting of hydrogen, alkyl radicals of 1 to 18 carbon atoms, $-(CH_2)_rX'$ wherein $X'$ represents a halogen, a pyridinium salt of said halogen, hydroxyl, and $-OSO_3H$ or an alkali metal derivative thereof and $r$ is an integer of at least 2; a radical of the formula $$-NHR_3$$

wherein $R_3$ is a member selected from the group consisting of hydrogen, alkyl radicals of 1 to 5 carbon atoms, $$-\overset{O}{\overset{\|}{C}}-R_4$$

radicals wherein $R_4$ represents an alkyl radical of 1 to 18 carbon atoms, $-CH=CH_2$, $-(CH_2)_sX''$ radicals wherein $X''$ represents a halogen or a pyridinium salt of said halogen and $s$ is an integer of at least 1, a sulfonyl radical comprising the free acid or an ester or alkali metal derivative thereof, $-SO_2R_5$ wherein $R_5$ is a halogen and $-SO_2NHR_2$ wherein $R_2$ is as defined above.

2. A compound according to claim 1 wherein A is selected from the group consisting of (a) perfluoroalkyl radicals of the formula

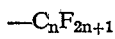

wherein $n$ is an integer from 4 to 20;
(b) polyfluoroalkyl radicals of the formula

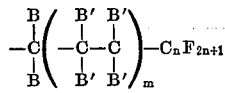

wherein B at each occurrence is hydrogen or fluorine and B' at each occurrence independently can be hydrogen, fluorine or perfluoroalkyl radicals of 1 to 8 carbon atoms, $m$ is an integer from 1 to 20 and $n$ is as defined above; and
(c) polyfluoroalkyoxyalkyl radicals of the formula

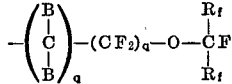

wherein B is as defined above, $p$ is an integer from 0 to 40, $q$ is an integer from 1 to 20 and $R_f$ is a perfluoroalkyl radical of 1 to 8 carbon atoms.

3. 1,2-bis(perfluorooctanamido)benzene.
4. 1,3-bis(perfluorooctanamido)benzene.
5. 1,4-bis(perfluorooctanamido)benzene.
6. 3,4-bis(perfluorooctanamido)toluene.
7. 3,4-bis(perfluorooctanamido)chlorobenzene.
8. 3,4-bis(perfluorooctanamido)methylbenzoate.
9. 3,4-bis(perfluorooctanamido)nitrobenzene.
10. 3,4-bis(perfluorooctanamido)chloroacetanilide.
11. 1,2-bis(2,2,3,3,4,4-hexafluoro - 4 - heptafluoroisopropoxybutyramido)benzene.
12. 1,3-bis(2,2,3,3,4,4-hexafluoro - 4 - heptafluoroisopropoxybutyramido)benzene.
13. 1,2-bis(2,2,3,3,4,4,5,5,6,6-decafluoro - 6 - heptafluoroisopropoxyhexanamido)benzene.
14. A textile fabric treated with a compound having the formula

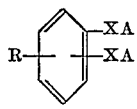

wherein X at each occurrence is a divalent radical independently selected from the group consisting of

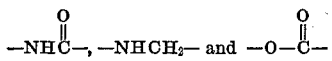

A at each occurrence is a fluorinated aliphatic radical having at least three terminal perfluorinated carbon atoms and a total of at least four perfluorinated carbon atoms; and R is a substituent which can be hydrogen; an alkyl radical of 1 to 5 carbon atoms; a halogen; nitro; a radical of the formula

wherein $R_1$ is hydrogen or an alkyl radical of 1 to 18 carbon atoms; a radical of the formula

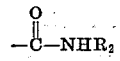

wherein $R_2$ is a member selected from the group consisting of hydrogen, alkyl radicals of 1 to 18 carbon atoms, $-(CH_2)_rX'$ wherein $X'$ represents a halogen, a pyridinium salt of said halogen, hydroxyl, and $-OSO_3H$ or an alkali metal derivative thereof and $r$ is an integer of at least 2; a radical of the formula

wherein $R_3$ is a member selected from the group consisting of hydrogen, alkyl radicals of 1 to 5 carbon atoms,

radicals wherein $R_4$ represents an alkyl radical of 1 to 18 carbon atoms, $-CH=CH_2$, $-(CH_2)_sX''$ radicals wherein $X''$ represents a halogen or a pyridinium salt of said halogen and $s$ is an integer of at least 1, a sulfonyl radical comprising the free acid or an ester of alkali metal derivative thereof, $-SO_2R_5$ wherein $R_5$ is a halogen and $-SO_2NHR_2$ wherein $R_2$ is as defined above.

15. A textile fabric according to claim 14 wherein A is selected from the group consisting of
(a) perfluoroalkyl radicals of the formula

wherein $n$ is an integer from 4 to 20;
(b) polyfluoroalkyl radicals of the formula

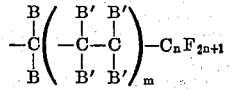

wherein B at each occurrence is hydrogen or fluorine and B' at each occurrence independently can be hydrogen, fluorine or perfluoroalkyl radicals of 1 to 8 carbon atoms, $m$ is an integer from 1 to 20 and $n$ is as defined above; and
(c) polyfluoroalkoxyalkyl radicals of the formula

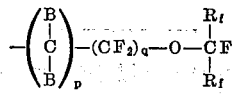

wherein B is as defined above, $p$ is an integer from 0 to 40, $q$ is an integer from 1 to 20 and $R_f$ is a perfluoroalkyl radical of 1 to 8 carbon atoms.

16. A textile fabric according to claim 15 wherein said compound is 3,4-bis(perfluorooctanamido)chloroacetanilide.

17. A substrate treated with a composition of a compound having the formula

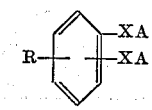

wherein X at each occurrence is a divalent radical independently selected from the group consisting of

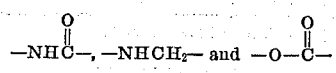

A at each occurrence is a fluorinated aliphatic radical having at least three terminal perfluorinated carbon atoms and a total of at least four perfluorinated carbon atoms; and R is a substituent which can be hydrogen; an alkyl radical of 1 to 5 carbon atoms; a halogen; nitro; a radical of the formula

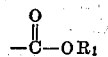

wherein $R_1$ is hydrogen or an alkyl radical of 1 to 18 carbon atoms; a radical of the formula

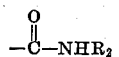

wherein $R_2$ is a member selected from the group consisting of hydrogen, alkyl radicals of 1 to 18 carbon atoms, $-(CH_2)_rX'$ wherein $X'$ represents a halogen, a pyridinium salt of said halogen, hydroxyl, and $-OSO_3H$ or an alkali metal derivative thereof and $r$ is an integer of at least 2; a radical of the formula

wherein $R_3$ is a member selected from the group consisting of hydrogen, alkyl radicals of 1 to 5 carbon atoms,

radicals wherein $R_4$ represents an alkyl radical of 1 to 18 carbon atoms, $-CH=CH_2$, $-(CH_2)_sX''$ radicals wherein $X''$ represents a halogen or a pyridinium salt of said halogen and $s$ is an integer of at least 1, a sulfonyl radical comprising the free acid or an ester of alkali metal derivative thereof, $-SO_2R_5$ wherein $R_5$ is a halogen and $-SO_2NHR_2$ wherein $R_2$ is as defined above.

18. A substrate according to claim 17 wherein A is selected from the group consisting of
(a) perfluoroalkyl radicals of the formula

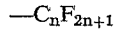

wherein $n$ is an integer from 4 to 20;
(b) polyfluoroalkyl radicals of the formula

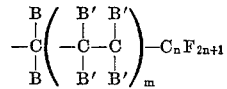

wherein B at each occurence is hydrogen or fluorine and B' at each occurrence independently can be hydrogen, fluorine or perfluoroalkyl radicals of 1 to 8 carbon atoms, $m$ is an integer from 1 to 20 and $n$ is as defined above; and (c) polyfluoroalkoxyalkyl radicals of the formula

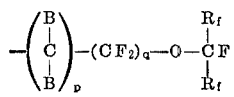

wherein B is as defined above, $p$ is an integer from 0 to 40, $q$ is an integer from 1 to 20 and $R_f$ is a perfluoroalkyl radical of 1 to 8 carbon atoms.

References Cited
UNITED STATES PATENTS

| | | | |
|---|---|---|---|
| 2,809,990 | 10/1957 | Brown | 260—534 |
| 2,958,613 | 11/1960 | Nelson et al. | 117—121 |
| 3,398,182 | 8/1968 | Guenthner et al. | 117—139.5X |

WILLIAM D. MARTIN, Primary Examiner

T. G. DAVIS, Assistant Examiner

U.S. Cl. X.R.

117—138.8, 139.5, 141, 143, 155; 260—404.5, 562